(12) United States Patent
Muralidharan

(10) Patent No.: US 10,719,724 B2
(45) Date of Patent: Jul. 21, 2020

(54) SAFETY SYSTEM FOR AN AUTOMOBILE

(71) Applicant: Santhosh Muralidharan, Nilgiris (IN)

(72) Inventor: Santhosh Muralidharan, Nilgiris (IN)

(73) Assignee: BLINKEYELABS ELECTRONICS PRIVATE LIMITED, Bangalore, Karnataka (IN)

( * ) Notice: Subject to any disclaimer, the term of this patent is extended or adjusted under 35 U.S.C. 154(b) by 172 days.

(21) Appl. No.: 15/375,189

(22) Filed: Dec. 12, 2016

(65) Prior Publication Data

US 2018/0056865 A1   Mar. 1, 2018

(30) Foreign Application Priority Data

Aug. 23, 2016  (IN) .............................. 201641028678

(51) Int. Cl.
*B60W 50/14*    (2020.01)
*G06K 9/00*    (2006.01)
*B60W 40/09*    (2012.01)

(52) U.S. Cl.
CPC ......... *G06K 9/00845* (2013.01); *B60W 40/09* (2013.01); *B60W 50/14* (2013.01); *G06K 9/00805* (2013.01)

(58) Field of Classification Search
CPC .............. B60Q 9/008; G06K 9/00798; G06K 9/00805; G06K 9/00838; G06K 9/00845; H04M 1/72577; H04N 5/247
USPC ....................................................... 348/148
See application file for complete search history.

(56) References Cited

U.S. PATENT DOCUMENTS

| 9,117,124 | B2* | 8/2015 | Terada | A61B 5/0006 |
| 9,834,221 | B2* | 12/2017 | Nilsson | B60W 40/09 |
| 9,915,539 | B2* | 3/2018 | Chia | G01C 21/34 |
| 2002/0140562 | A1* | 10/2002 | Gutta | G08B 21/06 340/576 |
| 2007/0168128 | A1* | 7/2007 | Tokoro | B60R 21/013 701/301 |
| 2009/0022368 | A1* | 1/2009 | Matsuoka | B60K 35/00 382/103 |
| 2014/0085113 | A1* | 3/2014 | Bonhoure | B60K 35/00 340/932.2 |
| 2014/0139655 | A1* | 5/2014 | Mimar | G08B 21/06 348/77 |
| 2014/0142798 | A1* | 5/2014 | Guarnizo Martinez | B60W 10/18 701/23 |
| 2014/0272811 | A1* | 9/2014 | Palan | G07C 5/008 434/66 |

(Continued)

*Primary Examiner* — Christopher G Findley

(57) ABSTRACT

A safety system for an automobile is provided. The safety system (102) comprises a first camera (202), a second camera (204) and a processing module (302). The module (302) is configured to detect, whether the driver is attentive and the presence of an object on the road by processing video input from the first camera (202) and the second camera (204), respectively. Further, the module (302) determines the time required for the automobile to reach the detected object. The module (302) generates an alert if the driver is inattentive. Alerting is initiated when the encounter time is ≤ to a second preconfigured time, if the driver lacks at least a peripheral view of the road ahead. Alternatively, alerting is initiated when the encounter time is ≤ to a first preconfigured time, if the driver only has a peripheral view of the road ahead.

17 Claims, 11 Drawing Sheets

(56) References Cited

U.S. PATENT DOCUMENTS

| | | | |
|---|---|---|---|
| 2016/0018228 A1* | 1/2016 | Parker | G01C 21/3623 701/412 |
| 2016/0068103 A1* | 3/2016 | McNew | B60Q 9/00 701/23 |
| 2016/0110618 A1* | 4/2016 | Oba | G06K 9/00845 348/148 |
| 2016/0193999 A1* | 7/2016 | Sasabuchi | B60T 7/22 701/301 |
| 2016/0196098 A1* | 7/2016 | Roth | B60Q 9/00 715/761 |
| 2016/0203582 A1* | 7/2016 | Nakai | G09G 3/001 345/632 |
| 2016/0297365 A1* | 10/2016 | Nix | B60R 1/002 |
| 2016/0297449 A1* | 10/2016 | Heim | B60W 40/09 |
| 2017/0161576 A1* | 6/2017 | Banno | G06K 9/00845 |
| 2017/0166131 A1* | 6/2017 | Oba | B60R 1/002 |

\* cited by examiner

SAFETY SYSTEM FOR AN AUTOMOBILE

BACKGROUND

Field of Invention

The subject matter in general relates to safety systems. More particularly, but not exclusively, the subject matter relates to an automobile safety system.

Discussion of Related Art

The number of casualties due to accidents on the road have increased drastically over the past few decades. The chances of such accidents occurring increases when the drivers are distracted. Distraction is often caused by the use of smartphones while driving. Such usage may relate to answering calls, and reading or replying to messages, emails and updates, among others. Further, an increasing number of drivers experience drowsiness while driving, which may also be a cause for accidents.

Conventional systems attempt to decrease the chances of accidents by alerting the driver when the automobile crosses a threshold speed. Some of the conventional systems are configured to detect and alert when the driver falls asleep. However, such conventional systems are integrated with the automobile and hence are not portable between automobiles. Further, a driver falling asleep may not always be the only form of distraction. Additionally, conventional systems tend to generate false alerts, which may encourage a driver to turn-off the alerting system.

Conventional systems have also attempted to reduce distraction of drivers by disabling some of the functionality of their smartphones. However, the driver will have to connect to the system by carrying out certain steps to connect the smartphone to the system. It has been observed that many of the drivers choose to ignore such steps, since it requires the driver to proactively carryout said steps.

In light of the foregoing discussion, there is a need for an improved automobile safety system that can alert a driver who is distracted or drowsy and also reduce the distraction caused by usage of smartphones.

SUMMARY

In an embodiment, a safety system for an automobile is provided. The safety system comprises a first camera directed to have a field of view to capture video of a driver of the automobile and, a second camera directed to have a field of view to capture video of a road ahead of the automobile. The system further comprises a processing module which is configured to, detect whether the driver is attentive by processing video input from the first camera and detect the presence of an object on the road by processing video input from the second camera. Further, the processing module ascertains the speed at which the automobile is travelling and the distance of the detected object from the automobile. Consequently, the processing module determines an encounter time, wherein the encounter time is the time required for the automobile to reach the object based on the speed and the distance. Further, the processing module generates an alert if the driver is not attentive, wherein the alerting of the driver is initiated: if the driver lacks at least a peripheral view of the road ahead and the encounter time is less than or at least becomes equal to a second preconfigured time; or if the driver only has a peripheral view of the road ahead and the encounter time is less than or at least becomes equal to a first preconfigured time. Further, the second preconfigured time is greater than the first preconfigured time.

BRIEF DESCRIPTION OF DIAGRAMS

This disclosure is illustrated by way of example and not limitation in the accompanying figures. Elements illustrated in the figures are not necessarily drawn to scale, in which like references indicate similar elements and in which:

FIG. 1 illustrates a system 100 including an automobile safety system 102 and a driver's smartphone 104, in accordance with an embodiment.

FIGS. 2A and 2B illustrate simplified front and side views, respectively, of the automobile safety system 102 of the system 100, in accordance with an embodiment.

FIG. 3A is an exemplary block diagram 300 of the automobile safety system 102 of the system 100, in accordance with an embodiment.

DETAILED DESCRIPTION OF THE INVENTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

It should be understood that the capabilities of the invention described in the present disclosure and elements shown in the figures may be implemented in various forms of hardware, firmware, software, non-transitory computer readable medium or combinations thereof.

The embodiments disclose an automobile safety system 102.

Figure 1:
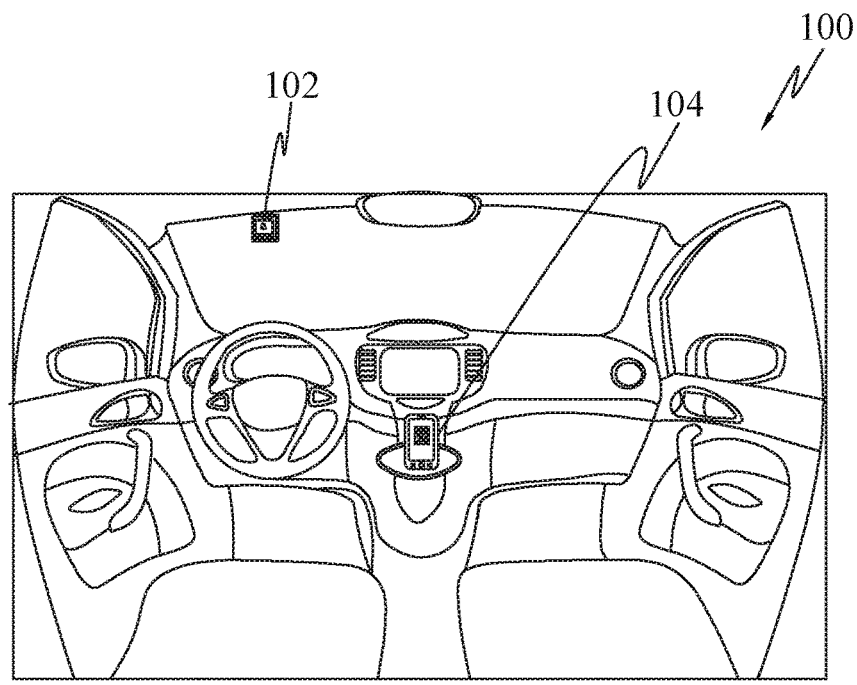

FIG. 1 is an exemplary architecture of a system 100 including an automobile safety system 102, in accordance with an embodiment. The system 100 depicted inside an automobile includes the automobile safety system 102 and a driver's smartphone 104, which may be referred to as a mobile device 104.

Figures 2A, 2B:
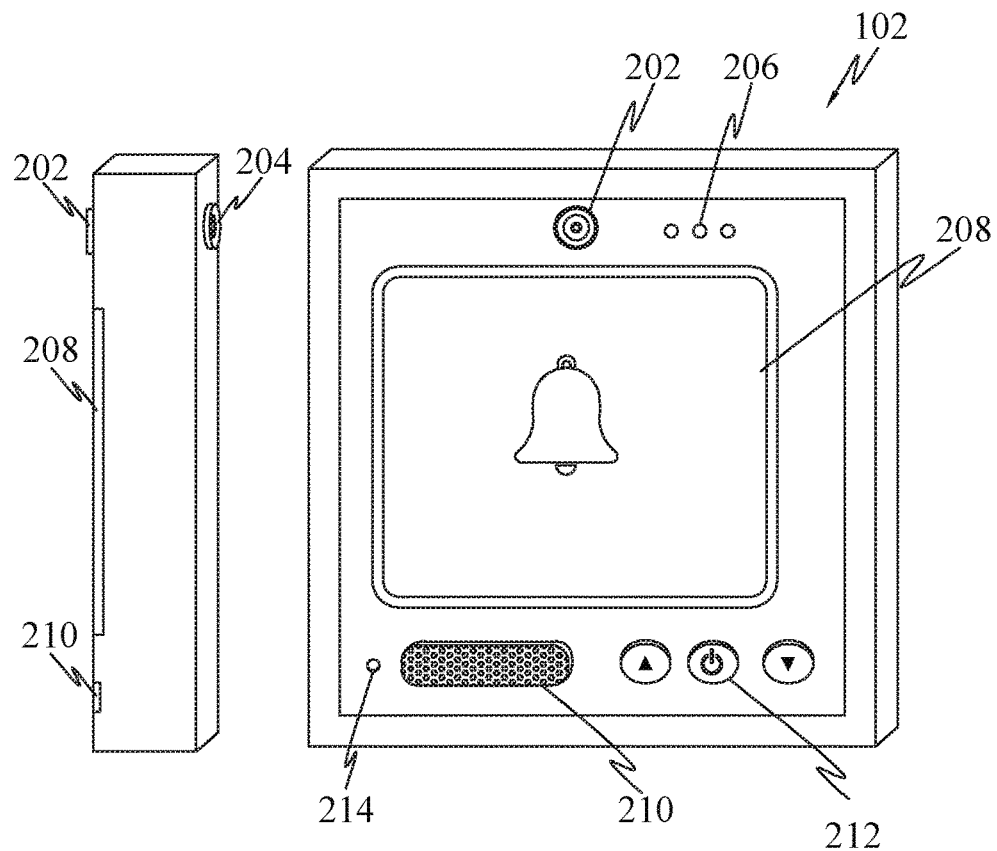

Referring to FIGS. 2A and 2B, the automobile safety system 102 is illustrated, in accordance with an embodiment. The automobile safety system 102 may include two cameras, of which a first camera 202 may be directed to have a field of view to capture video of a driver of the automobile and a second camera 204 may be directed to have a field of view to capture video of a road ahead of the automobile. The automobile safety system 102 may further include a speaker 210 through which an alert may be generated and a processing module 302 (illustrated in FIGS. 3A and 3B) which determines when to generate such alerts. The automobile safety system 102 may further include one or more buttons 212, which may be used by the driver to operate the automobile safety system 102, and a microphone 214 which may be able to receive audio signals with a frequency range of 20 to 20 KHz; or ultrasonic signals with a frequency greater than 20 KHz signals.

The first camera may be called a driver-facing camera 202. The driver-facing camera 202 may be of any type known in the art, preferably a thermographic (infrared) camera. The sequence of frames recorded by the driver-facing camera 202 may be communicated to an image-processing module 314 present in the processing module 302 of the automobile safety system 102 to determine whether the driver's attention is on the road ahead.

The second camera may be called a road-facing camera 204. The road-facing camera 204 may be of any type known in the art, preferably a thermographic (infrared) camera. The sequence of frames recorded by the road-facing camera 204 may be communicated to the image-processing module 314 present in the processing module 302 of the automobile safety system 102 to determine whether an object is present on the road ahead.

In an embodiment, the automobile safety system 102 may comprise multiple road-facing cameras 204. The multiple road-facing cameras 204 may comprise similar or different focal points. The sequence of frames recorded by the multiple road-facing cameras 204 may be communicated to the image-processing module 314 present in the processing module 302 of the automobile safety system 102 to determine the distance between the automobile and an object present on the road ahead.

Figure 5A:
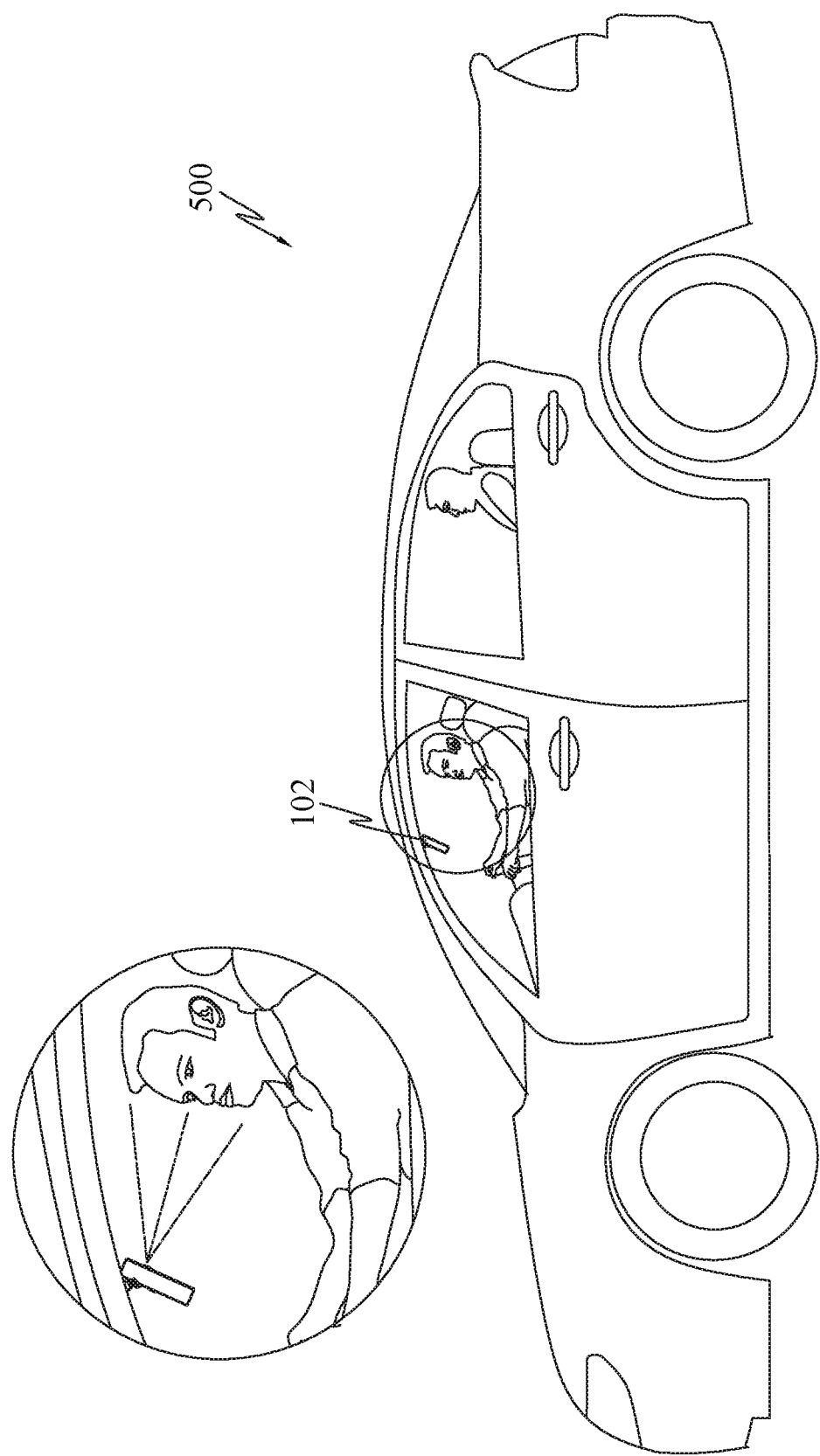
FIG. 5A illustrates an exemplary implementation of the automobile safety system 102 in an automobile, in accordance with an embodiment.
Figure 5B:
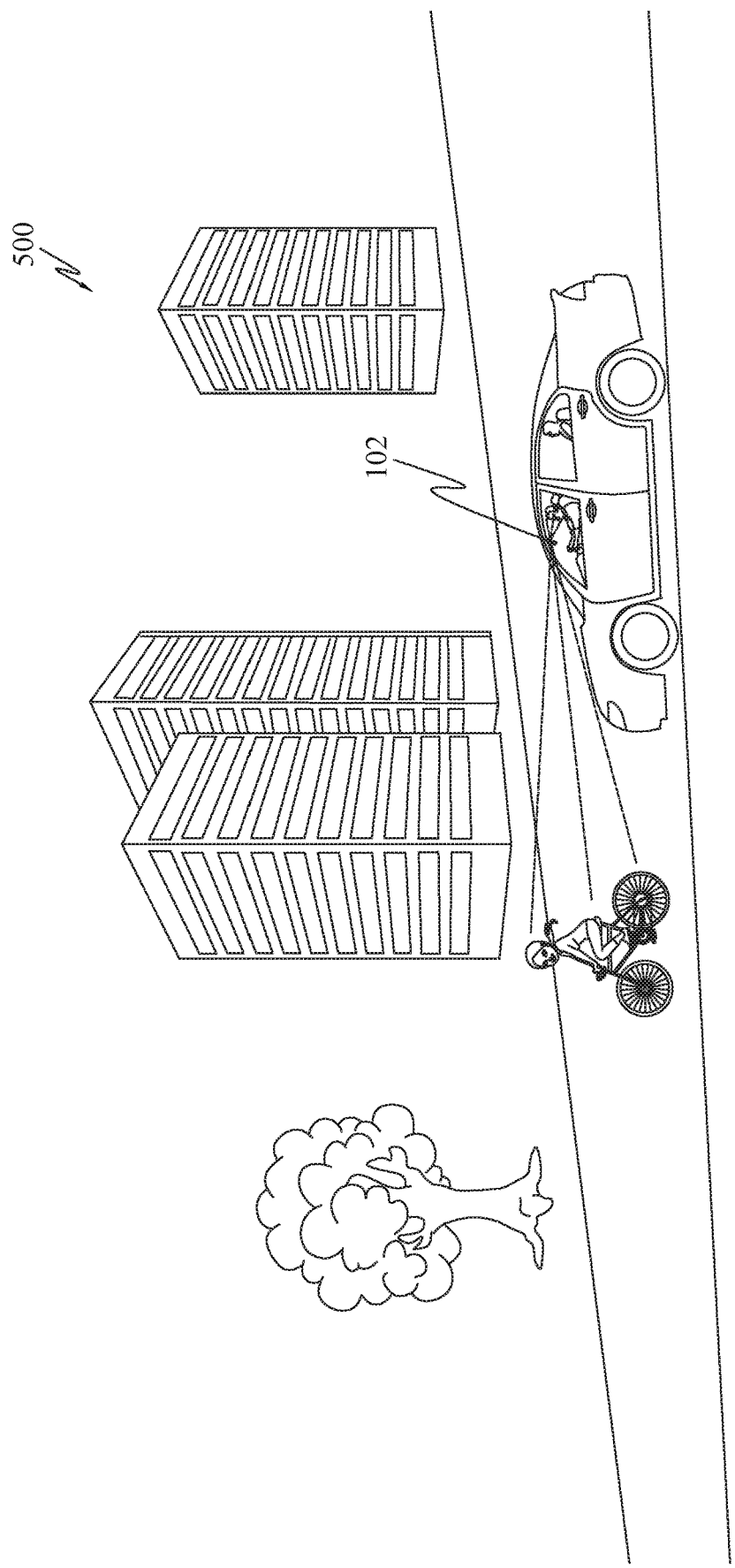
FIG. 5B illustrates an exemplary implementation of the automobile safety system 102 in an automobile, in accordance with an embodiment.

In an embodiment, the automobile safety system 102 may comprise a housing that may be configured to be attached and detached from an automobile of the driver. The automobile safety system 102 may preferably be positioned at one among the following positions in the automobile as depicted in FIGS. 5A and 5B: between the steering wheel and front windshield, on the dashboard of the automobile, attached to the rear-view mirror, attached to the front windshield of the automobile or attached to the roof of the automobile.

In an embodiment, the automobile safety system 102 may be configured to work in all types of automobiles such as a truck, bus and sports utility vehicle, among other types of automobiles present or which may be present in the future.

In an embodiment, the automobile safety system 102 may be powered by an internal or external power source. The automobile safety system 102 may also be configured to be powered through an automobile cigarette charger port of the automobile.

In an embodiment, the automobile safety system 102 may work in a low-powered state in case the automobile is turned on. Further, in case the automobile starts to move, the automobile safety system 102 may work in a high-powered state. The automobile safety system 102 may start to function automatically without any user intervention in case the automobile safety system 102 detects that the automobile is in motion.

In an embodiment, in case the automobile safety system 102 is battery operated, it may remain in a low power mode when the vehicle engine is OFF, and may remain in an active or high-powered mode when the engine is ON and when the vehicle starts moving.

In an embodiment, the automobile safety system 102 may start to function in case the driver presses a power button among buttons 212 on the automobile safety system 102.

In an embodiment, the speaker 210 may be used to generate an alert to warn the driver during potentially harmful situations so that the driver may avoid colliding with an obstacle or object. The speaker 210 may also emit audio signals with a frequency range of 20 to 20 KHz; or ultrasonic signals with a frequency greater than 20 KHz in order to establish communication with the driver's mobile device 104. These audio or ultrasonic signals may be detected by the driver's mobile device 104.

Figure 3A:
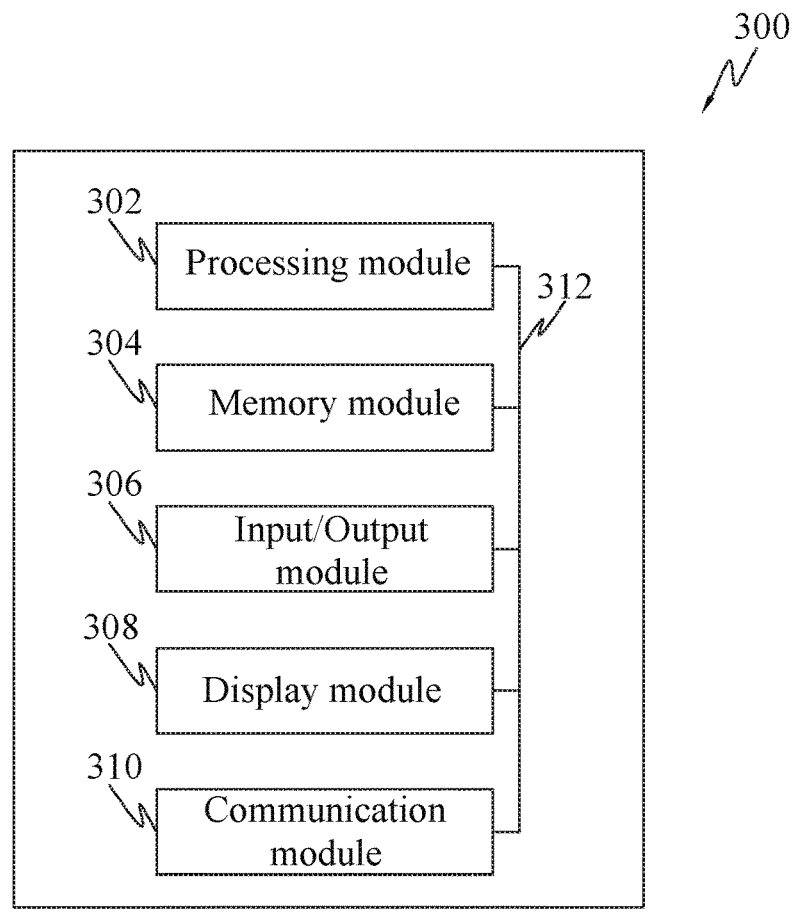
FIG. 3B is an exemplary block diagram of a processing module 302 of the automobile safety system 102, in accordance with an embodiment.

FIG. 3A is an exemplary block diagram of the automobile safety system 102 of the system 100, in accordance with an embodiment. The automobile safety system 102 may include a processing module 302, a memory module 304, an input/output module 306, communication module 310, and a bus 312 connecting all the modules of the automotive safety system 102.

In an embodiment, the automobile safety system 102 may further include a display module 308. This display module 308 may be used as an input/output device and may take inputs from a driver and display some output to a driver. The display module 308 may also be used to alert the driver.

The processing module 302 of the automobile safety system 102 may be used to determine situations wherein the driver needs to be alerted in case of a potentially harmful situation. The processing module 302 may be implemented in the form of one or more processors and may be implemented as appropriate in hardware, computer-executable instructions, firmware, or combinations thereof. Computer-executable instruction or firmware implementations of the processing module 302 may include computer-executable or machine-executable instructions written in any suitable programming language to perform the various functions described. Further, the processing module 302 may communicate with the other modules of the automobile safety system 102 through the bus 312.

The memory module 304 may be implemented in the form of a primary and a secondary memory. The memory module 304 may store additional data and program instructions that are loadable and executable on the processing module 302, as well as data generated during the execution of these programs. Further, the memory module 304 may be a volatile memory, such as random access memory and/or a disk drive, or non-volatile memory. The memory module 304 may comprise of removable memory such as a Compact Flash card, Memory Stick, Smart Media, Multimedia Card, Secure Digital memory, or any other memory storage that exists currently or may exist in the future.

The input/output module 306 may provide an interface for input devices such as the road-facing camera 204, the driver-facing camera 202, the microphone 214 and the driver's mobile device 104, and output devices such as the speaker 210, display 208 and lights 206, among others.

In an embodiment, the automobile safety system 102 may include one or more additional speakers for emitting audio signals with a frequency range of 20 to 20 KHz; or ultrasonic signals with a frequency greater than 20 KHz signals.

The communication module 310 may provide an interface to communicate with the driver's mobile device 104. The communication module 310 may also enable communication with remote systems. The communication module 310 may include an antenna and a communication port, among others and may include devices supporting both wired and wireless protocols. Data in the form of electronic, electromagnetic and optical signal, among other signals may be transferred via the communication module 310. Further, the communication module 310 may be compatible with different technologies including NFC, ultrasound, Bluetooth, WLAN, USB and GPS, among others.

Figure 3B:
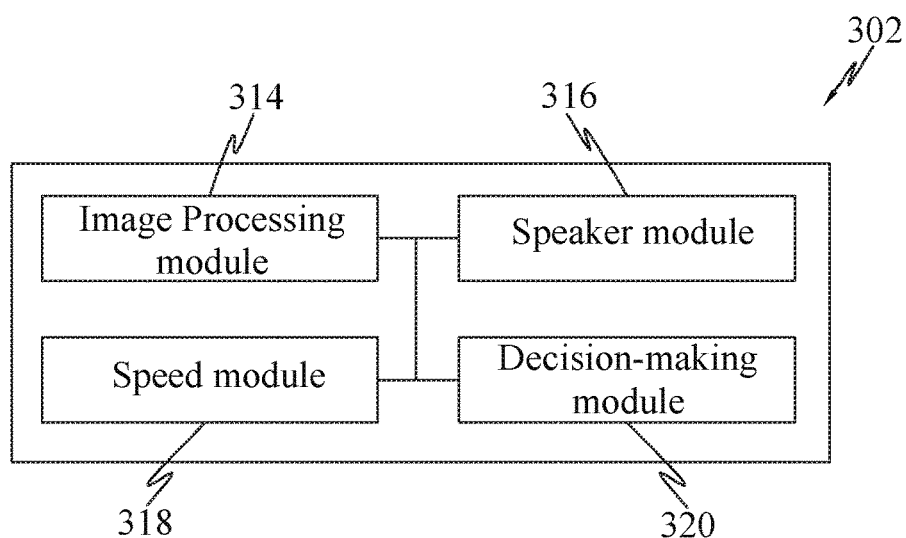

FIG. 3B is an exemplary block diagram of the processing module 302 of the automobile safety system 102 of the system 100, in accordance with an embodiment. The processing module 302 may comprise an image-processing module 314, a speaker module 316, a speed module 318 and a decision-making module 320.

The image-processing module 314 may be configured to receive video in the form of a stream of images from the driver-facing camera 202 and the road-facing camera 204.

In an embodiment, the video received by the image-processing module 314 from the driver-facing camera 202 may be processed by the image-processing module 314 using various image processing techniques. These image processing techniques may detect facial features of the driver such as their eyes, nose, mouth and head angle in order to determine the positioning of the driver's face with respect to the forward direction of the automobile. This positioning may be named a facial pose of the driver, and the status of the facial pose may be determined. This status of facial pose may include one of: facing the road ahead, looking towards the right, looking towards the left, looking upwards, and completely turned sideways, backwards or downwards. The status of the facial pose may be communicated to the decision-making module 320.

Further, the video received from the driver-facing camera 202 may be processed by the image-processing module 314 using various image processing techniques in order to detect the eyes of the driver. The image-processing module 314 may analyse the images to determine the status of one or more of: whether the driver's eyes are visible, open, closed, or wearing spectacles. These may be called the status of the gaze of the driver, and may be communicated to the decision-making module 320.

In some situations, the driver may lack at least a peripheral view of the road. Such situations may include one or more among: the driver's eyes being closed or drowsy, the driver having completely turned their head backwards, and the driver having bent down completely, among other positions where not even a peripheral view of the road may be seen.

In some situations, the driver may possess only a peripheral view of the road. Such situations may include one or more among: the driver having turned his head sideways, upwards or downwards, among other positions where the road ahead is seen only in a peripheral view of the driver.

The video received from the single or multiple road-facing cameras 204 may be processed by the image-processing module 314 using various image processing techniques. These image processing techniques may detect an object ahead of the automobile. Further, the image processing techniques may detect and identify one or more features of the detected object such as its position, pixel size of the object and rate of change of pixel size of the object in order to determine the distance between the road-facing camera 204 mounted in the automobile and the object on the road. This distance between the automobile and the object on the road may be termed as separation distance. The image-processing module 314 may communicate the presence of a detected object and the separation distance from the automobile to the same object with the decision-making module 320.

Further, upon receiving instructions from the decision-making module 320 to raise an alert, the speaker module 316 may direct the speaker 210 to emit an alert. This alert may include one or more of an audio alert from the speaker 210, a light alert from the display 208 or light 206, a vibratory alert or a combination of these, among others.

The speed module 318 in the processing module 302 may be configured to calculate the speed of the automobile. In an embodiment, the automobile safety system 102 may include a Global Positioning System (GPS) module which may be used to determine whether the automobile is in motion. The GPS module may be used to detect one or more features of the automobile such as location, distance covered, speed, time of travel and direction of travel. Further, the speed module 318 may use these features to determine the speed of the automobile.

In an embodiment, the speed module 318 may communicate with the road-facing camera(s) 204 and the image-processing module 314 to receive a video feed from the road-facing camera 204. Further, the speed module 318 may process and analyse various consequent frames from the video feed in order to determine the speed of the automobile.

In an embodiment, the speed module 318 may communicate with the road-facing camera 204 and the image-processing module 314 to receive a video feed from the road-facing camera 204. Further, the speed module 318 may receive the distance between the object and the automobile from the image-processing module 314. The speed module 318 may be configured to analyse the received data in order to determine the speed of the travelling automobile.

The speed module 318 may further be able to determine one or more of whether an object is stationary, moving away or moving towards the automobile.

The speed module 318 may communicate the status of the motion of the automobile with the decision-making module 320. The status may include one or more of whether the automobile is in motion and at what speed it is moving.

In an embodiment, the decision-making module 320 may use artificial intelligence systems with one or more logic concepts such as fuzzy logic.

In an embodiment, the decision-making module 320 may receive one or more statuses regarding the facial pose and gaze of the driver from the driver-facing camera 202. In case the detected driver's facial pose or gaze are directed away from the road in front of the driver, the decision-making module 320 determines that the driver may be inattentive, drowsy or distracted.

In an embodiment, the decision-making module 320 may receive one or more statuses regarding the presence/absence of object, and the separation distance between the driver and the detected object from the road-facing camera 204. The decision-making device may determine from these statuses whether there is an object, and how far away it is from the automobile.

In an embodiment, the decision-making module 320 may receive one or more statuses regarding the automobile's motion and the speed of the automobile from the speed module 318. The decision-making module 320 may determine from the statuses whether the automobile is in motion, and how far away it is from a detected object.

In an embodiment, the decision-making module 320 may calculate an encounter time from the separation distance and the speed of the automobile. The encounter time may be the time taken by the automobile moving at the current speed of the automobile to reach an object at a current separation distance.

In an embodiment, the decision-making module 320 may also calculate a first preconfigured time and a second preconfigured time from the speed of the automobile. In another embodiment, the decision-making module 320 may calculate the first preconfigured time and the second preconfigured time from the separation distance and the speed of the automobile.

In an embodiment, the first preconfigured time may be the minimum time required by the driver to respond to an alert and, hence, safely respond to the situation for which the alert was raised. The first preconfigured time may correspond to one or more situations wherein a distracted driver may possess only a peripheral view of the road.

In an embodiment, the second preconfigured time may be the minimum time required by the driver to respond to an alert and, hence, safely respond to the situation for which the alert was raised. The second preconfigured time may correspond to one or more situations wherein the drowsy or distracted driver may lack even a peripheral view of the road.

In an embodiment, the first preconfigured time and the second preconfigured time are variables which vary with the speed of the automobile. The first and second preconfigured times may vary proportionately when the speed of the automobile varies. The variation of the first and second preconfigured times may be linear, non-linear or exponential by nature.

In an embodiment, the automobile safety system 102 may further comprise a sensor such as a gyroscopic sensor. This gyroscopic sensor may provide one or more inputs to the decision-making module 320. The automobile safety system 102 may use the inputs from the gyroscopic sensor to prevent a false alert from being generated.

In an embodiment, these inputs may be used to determine cases wherein the gyroscopic sensor detected that the automobile was shaken up or jolted during a drive. These cases must be detected since a pothole or a bumpy road may cause the driver's head to temporarily move out of the field of view of the driver-facing camera 202 because the driver's face was either not fully visible or incompletely detected. Further, in such cases, the decision making module may determine that an alert should not be generated. Such cases may include one or more of: if the driver's face was incompletely detected, or the driver's head was not facing the road, among others.

Figure 4:
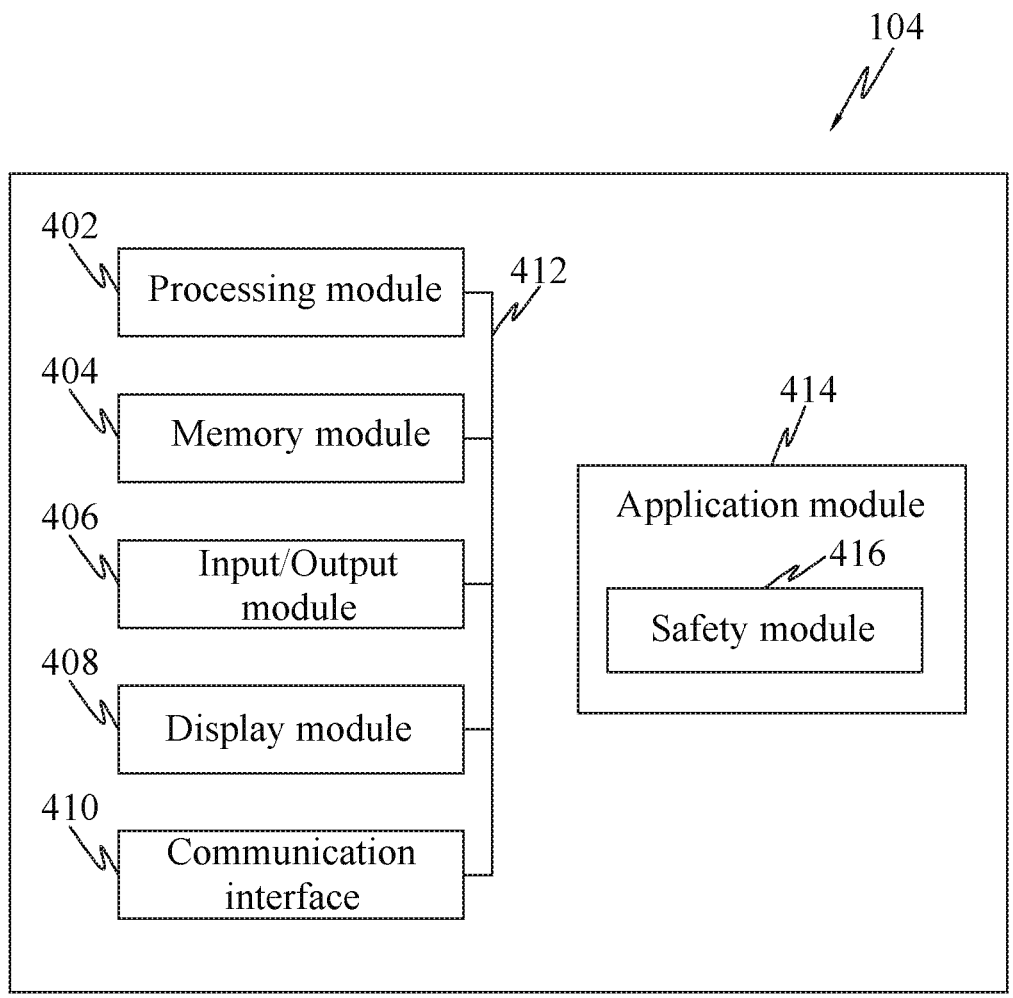
FIG. 4 is an exemplary block diagram of a driver's mobile device 104 of the system 100, in accordance with an embodiment.

FIG. 4 is an exemplary block diagram of the driver's mobile device 104 of the system 100, in accordance with an embodiment. The driver's mobile device 104 may include a processing module 402, a memory module 404, an input/output module 406, a display module 408, a communication interface 410, an application module 414, and a bus 412 connecting all the modules of the driver's mobile device 104.

The processing module 402, the memory module 404, the input/output module 406, the communication interface 410 and the bus 412 may be similar to the processing module 302, the memory module 304, the input/output module 306, the communication interface 310 and the bus 312 of the automobile safety system 102, respectively.

The input/output module 406 may further include a microphone which may be able to receive audio signals with a frequency range of 20 to 20 KHz; or ultrasonic signals with a frequency greater than 20 KHz sent by the automobile safety system 102, and a speaker which may be able to transmit similar signals to the automobile safety system 102.

The display module 408 may be configured to display content. The display module 408 may also be used to receive an input from a driver and/or display information to the driver. The display module 408 may be of any display type known in the art, for example, Liquid Crystal Displays (LCD), Light emitting diode displays (LED), Cathode Ray Tube Displays (CRT), Orthogonal Liquid Crystal Displays (OLCD) or a combination of these or any other type of display currently existing or which may exist in the future.

In an embodiment, the application module 414 may be implemented as software. The driver's mobile device 104 may download an installer file that includes at least one application bundled with at least one configuration parameter.

The application module 414 may further comprise a safety module 416. The safety module 416 may allow the driver to perform various actions through the driver's mobile device 104 such as providing one or more driver profiles for one or more drivers, tracking the number of disturbances of a driver over a period of time, tracking the frequency of disturbances and speed limit crossings, among other data that may be processed by the automobile safety system 102.

In an embodiment, if the decision-making module 320 has determined that an objected is detected and the driver is inattentive by lacking the peripheral view of the road ahead, the decision-making module 320 may instruct the speaker module 316 to generate an alert through the speaker 210 when the encounter time is lesser than or equal to the second preconfigured time.

In an embodiment, if the decision-making module 320 has determined that an objected is detected and the driver is inattentive by having only a peripheral view of the road ahead, the decision-making module 320 may instruct the speaker module 316 to generate an alert through the speaker 210 when the encounter time is lesser than or equal to the calculated first preconfigured time.

In an embodiment, the decision-making module 320 may calculate a first distraction duration for the driver. The first distraction duration may be a minimum allowed time during which the driver may lack the peripheral view of the road. The first distraction duration may be inversely proportional to the current speed of the automobile.

In an embodiment, the decision-making module 320 may calculate a second distraction duration for the driver. The second distraction duration may be a minimum allowed time during which the driver may retain only a peripheral view of the road. The second distraction duration may be inversely proportional to the current speed of the automobile. In an embodiment, the first distraction duration is lesser than the second distraction duration. This is done to alert a driver sooner when the driver does not have even the peripheral view of the road as compared to alerting a driver who at least has a peripheral view of the road.

In an embodiment, in case the decision-making module 320 determines that an object is not detected and the driver lacks even a peripheral view of the road for a first distraction duration, the decision-making module 320 may instruct the speaker module 316 to generate an alert through the speaker 210.

In an embodiment, in case the decision-making module 320 determines that an object is not detected and the driver possesses only a peripheral view of the road for a second distraction duration, the decision-making module 320 may instruct the speaker module 316 to generate an alert through the speaker 210.

In an embodiment, even if no object is detected, the decision-making module 320 may instruct the speaker module 316 to generate an alert through the speaker 210 in case the speed of the automobile exceeds a predetermined speed threshold and the driver lacks the peripheral view of the road ahead at least for a first distraction duration.

In an embodiment, even if no object is detected, the decision-making module 320 may instruct the speaker module 316 to generate an alert through the speaker 210 in case the speed of the automobile exceeds a predetermined speed threshold and the driver may possess only a peripheral view of the road ahead at least for a second distraction duration.

In an embodiment, the decision-making module 320 may calculate or configure a speed threshold for the driver.

Figure 8A:
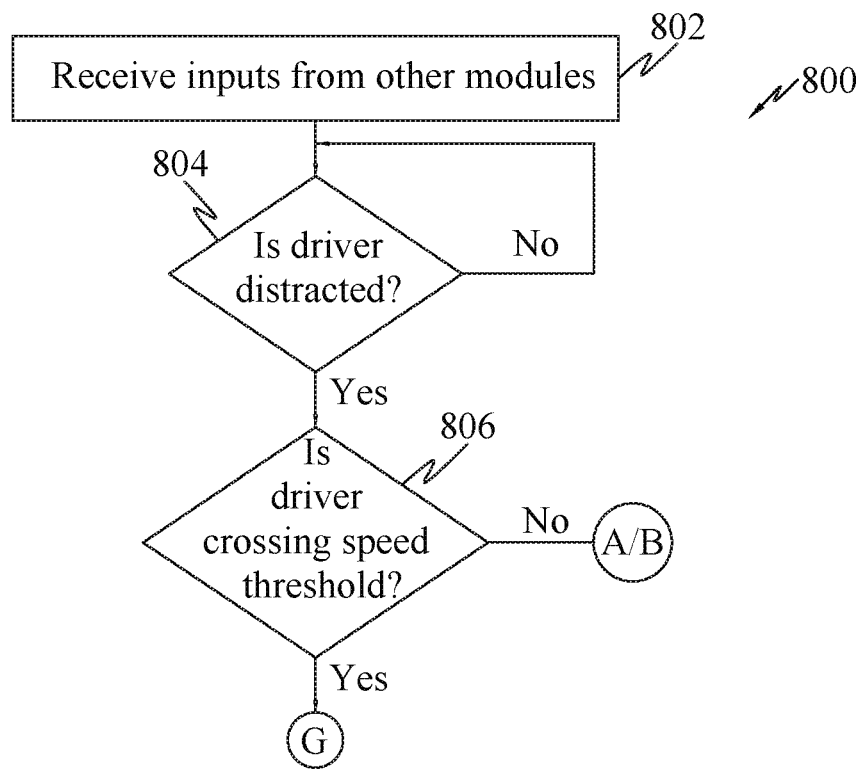

In an embodiment, the decision-making module 320 may determine that an alert must be generated when the speed of the automobile exceeds a predetermined speed threshold and the driver is not attentive (illustrated in FIG. 8A).

Figure 8B:
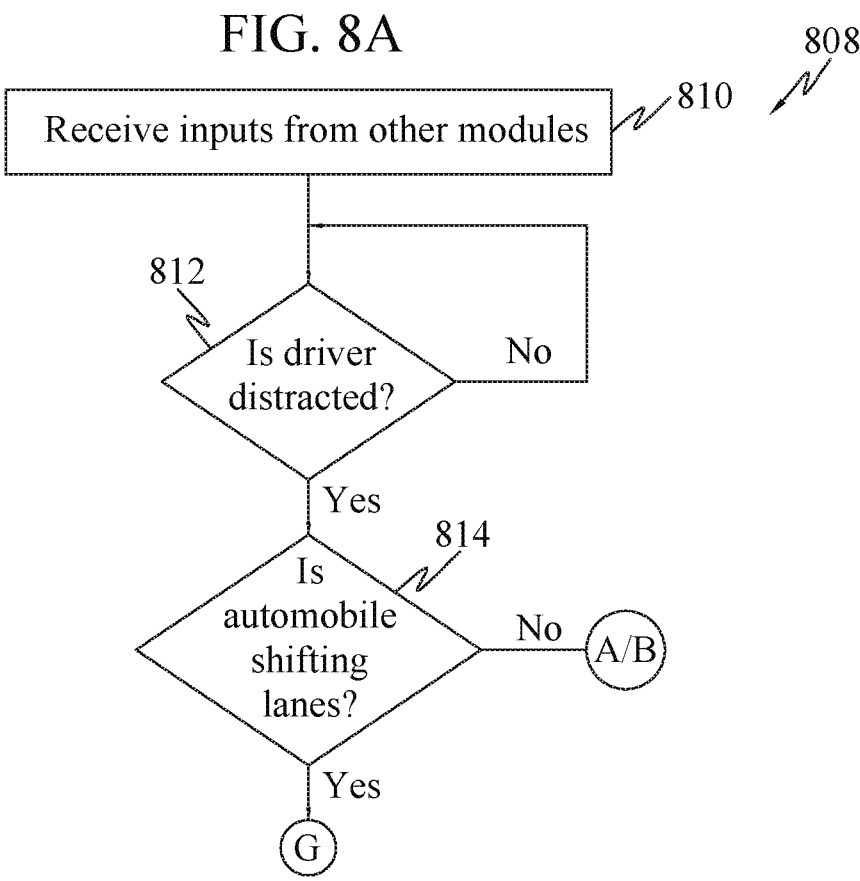

In an embodiment, the decision-making module 320 may determine that an alert must be generated when the automobile changes lanes and the driver is not attentive (illustrated in FIG. 8B).

Figure 9:
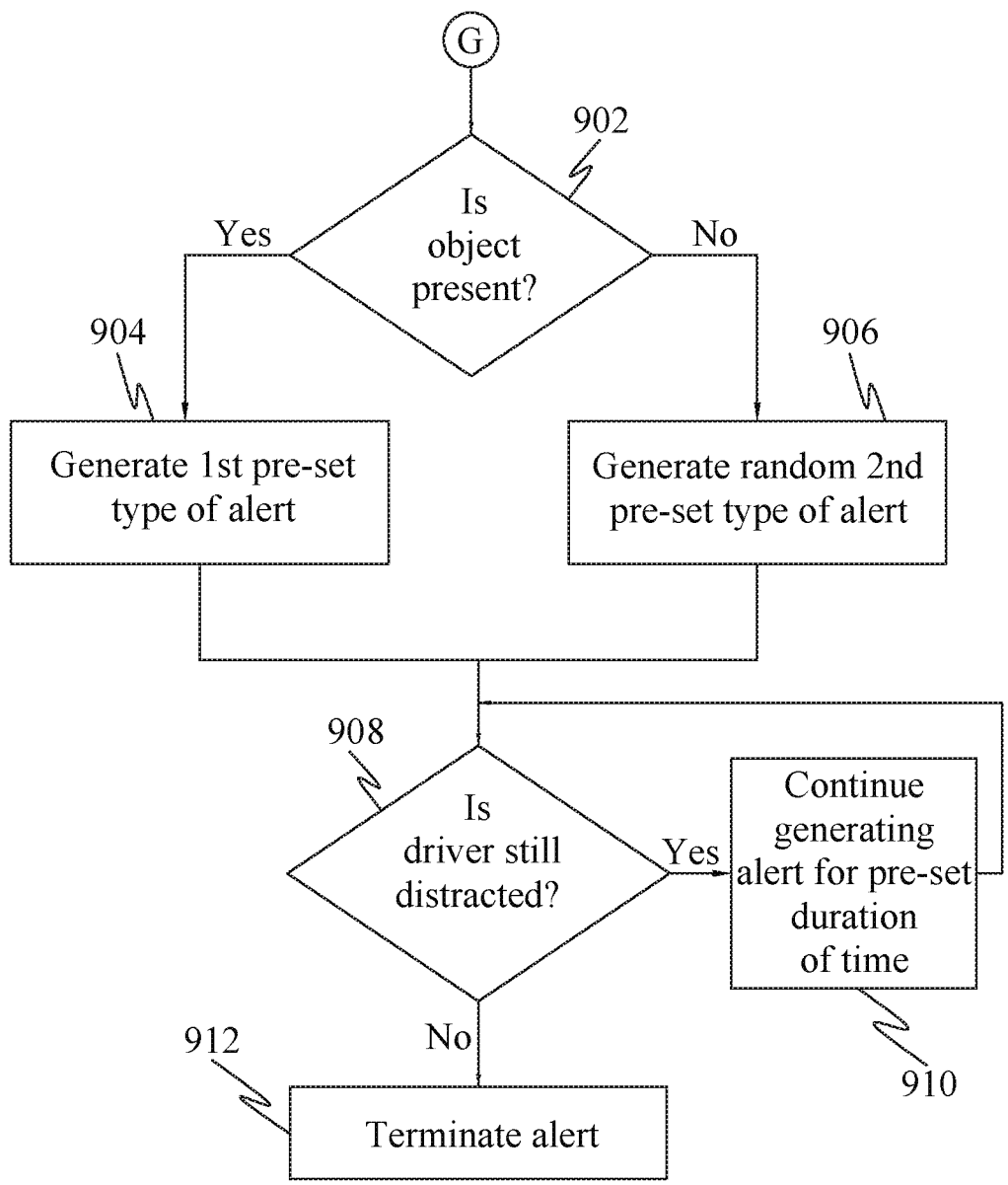

In an embodiment, the decision-making module 320 may instruct the speaker module 316 to terminate an alert in case the processing module 302 determines that the driver is back to being attentive (illustrated in FIG. 9).

In an embodiment, the automobile safety system 102 may be configured to be connectable with the driver's mobile device 104. In case the decision-making module 320 has received a status communication from the speed module 318 stating that the automobile is in motion, the decision-making module 320 may instruct the speaker module 316 to start sending ultrasonic signals of a predefined pattern. Once the safety module 416 on the driver's mobile device 104 has detected these ultrasonic signals, the safety module 416 may turn on a driving mode in the driver's user device and may also initiate communication with the automobile safety system 102.

In an embodiment, the decision-making module 320 may instruct the speaker module 316 to start sending audio signals with a frequency range of 20 to 20 KHz as an alternative to ultrasonic signals with a frequency greater than 20 KHz signals.

In an embodiment, the driving mode may ensure that any notifications appearing on the driver's mobile device 104 are not notified and are not sounded loudly. The notifications may include one or more of an electronic notification such as a call, a pop-up window on the driver's mobile device 104, an automated push notification, a Short Message Service (SMS), and/or an e-mail, among other notifications that may be received by the driver's mobile device 104. The driving mode of the driver's mobile device 104 may be used to silence any disturbances that may distract the driver while they are driving the automobile, thus ensuring the driver's safety and reducing chances of collisions or accidents.

In an embodiment, the automobile safety system 102 may be configured to allow notifications in some cases. Such a case may include: repeated calls from a pre-stored number of important contacts such as a spouse or family member. In case the pre-stored contact tries to contact the driver through the driver's mobile device for at least a predetermined number of times, the calls made by such contacts would be allowed to ring loudly on the driver's mobile device 104. This ensures that the driving mode is overridden during emergencies. As an example, the driver may have pre-stored the contacts of several family members in the safety module 416. Further, the driver may have configured the safety module 416 to override the driving mode in case one of the pre-stored contacts tries to contact the driver more than five times. Consequently, in case the driver receives more than 5 contact attempts from a pre-stored contact, the safety module 416 have decide to allow turn off the driving mode for all subsequent contact attempts from the pre-stored contact.

In an embodiment, one or more parameters such as first preconfigured time, second preconfigured time, speed threshold, first distraction duration and second distraction duration may be configured in the automobile safety system 102 by using an external source. Such an external source may include the safety module 416 installed on the driver's mobile device 104 or the display 208, among ways to configure the automobile safety system 102.

FIG. 5A, 5B illustrate an exemplary implementation of the automobile safety system 102 in an automobile, in accordance with an embodiment. As shown in the figure, the automobile safety system 102 may be positioned inside the automobile such that the road-facing camera 204 and the driver-facing camera 202 may have a correct and complete field of view of the road ahead of the automobile and at least the driver's head, respectively. An object may be detected by the road-facing camera 204 as shown in the figure. The driver may be given an alert based on the decisions of the decision-making module.

Figure 6:
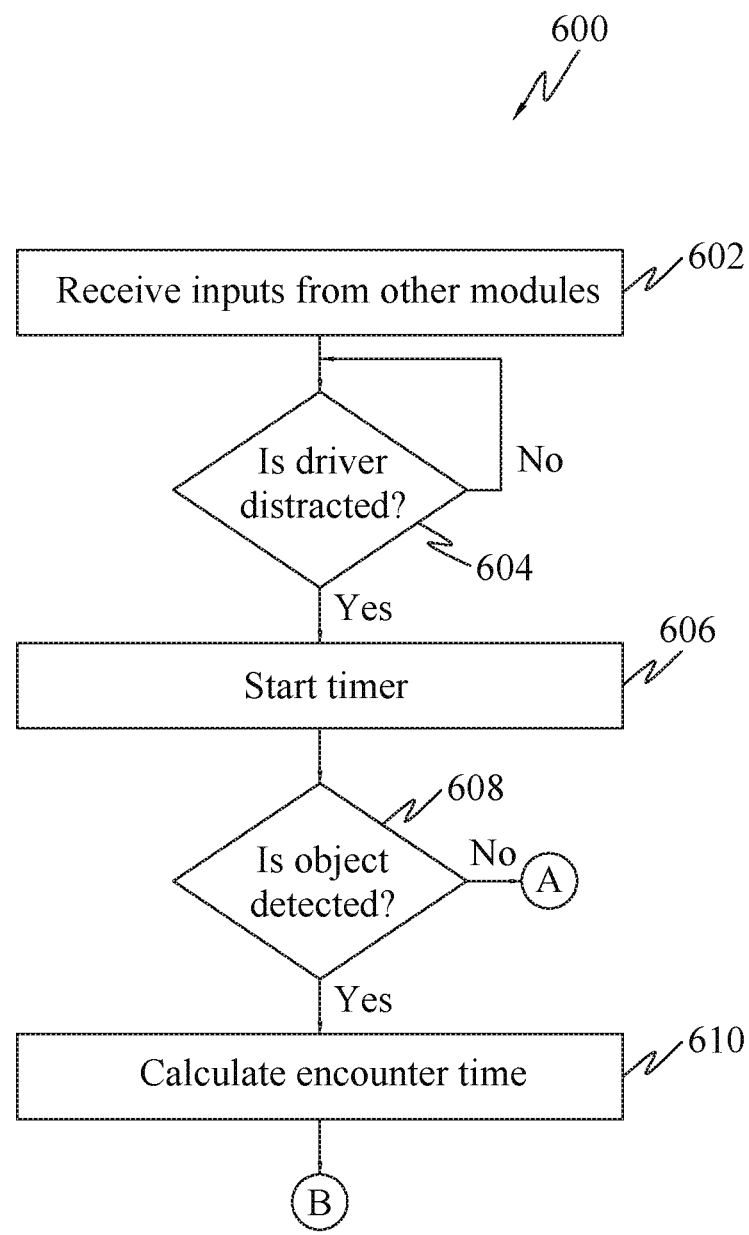
FIGS. 6 to 9 are flowcharts of an exemplary method for operating the automobile safety system 102, in accordance with an embodiment.

FIG. 6 depicts a flowchart of an exemplary method 600 for operating the automobile safety system 102, in accordance with an embodiment.

At step 602, the decision-making module 320 may receive one or more status inputs from the other modules in the processing module 302.

At step 604, the decision-making module 320 may determine, using the inputs received at step 602, whether the driver is drowsy or distracted. In case the driver is not drowsy or distracted, the decision-making module 320 may further monitor the inputs being received.

In case the driver is found to be drowsy or distracted, at step 606 the decision-making module 320 may start a timer to track the length of time during which the driver is inattentive, drowsy or distracted.

The decision-making module 320 may check whether an object has been detected at step 608. In case no object was detected, the decision-making module 320 may proceed towards step A in FIG. 7A.

In an embodiment, in case an object was detected, at step 610 the decision-making module 320 may calculate an encounter time taken by the automobile to encounter the object. Further, the decision-making module 320 may proceed towards step B in FIG. 7B.

In an embodiment, the safety system 102 is configured to continuously assess whether the driver is distracted (step 604), and abandon any of the steps succeeding step 604 the moment it is determined that the driver is not distracted.

Figure 7A:
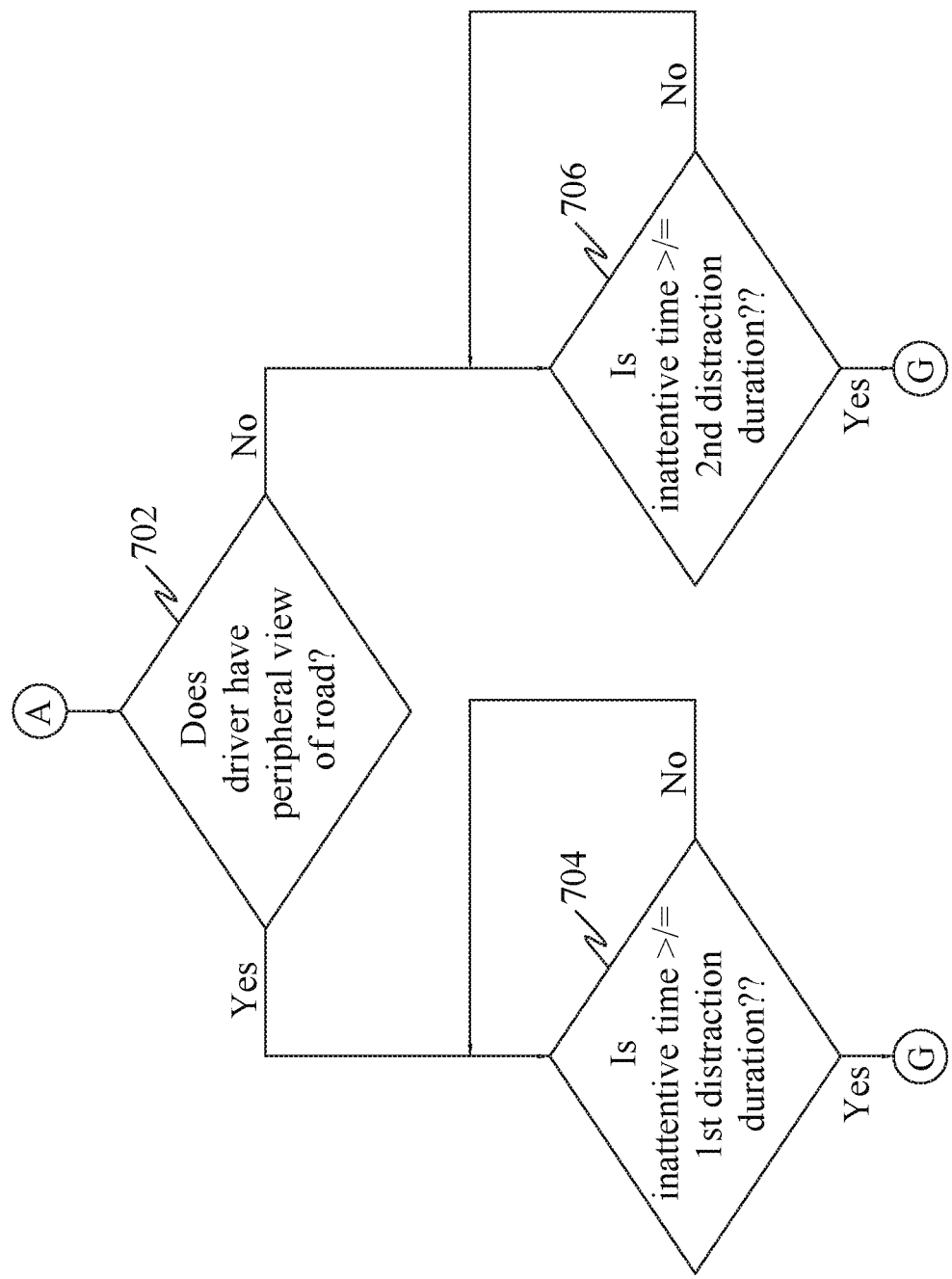

FIG. 7A depicts a flowchart of an exemplary method for operating the automobile safety system 102, in accordance with an embodiment. The method may describe how to generate an alert in case the driver was found to be inattentive and no object was detected.

At step 702, the decision-making module 320 determines whether the distracted driver has retained a peripheral view of the road or not. In case the driver has only the peripheral view of the road, the decision-making module 320 may determine whether the inattentive time of the driver is greater than the first distraction duration at step 704. In case the inattentive time is smaller, the decision-making module 320 may monitor the inattentive time until it exceeds the first distraction duration. In case the inattentive time is greater, the decision-making module 320 may proceed to step G of FIG. 9 to generate an alert.

In case the distracted driver does not even have the peripheral view of the road, the decision-making module 320 may determine whether the inattentive time of the driver is greater than the second distraction duration at step 706. In case the inattentive time is smaller, the decision-making module 320 may monitor the inattentive time until it exceeds the second distraction duration. In case the inattentive time is greater, the decision-making module 320 may proceed to step G of FIG. 9 to generate an alert.

Figure 7B:
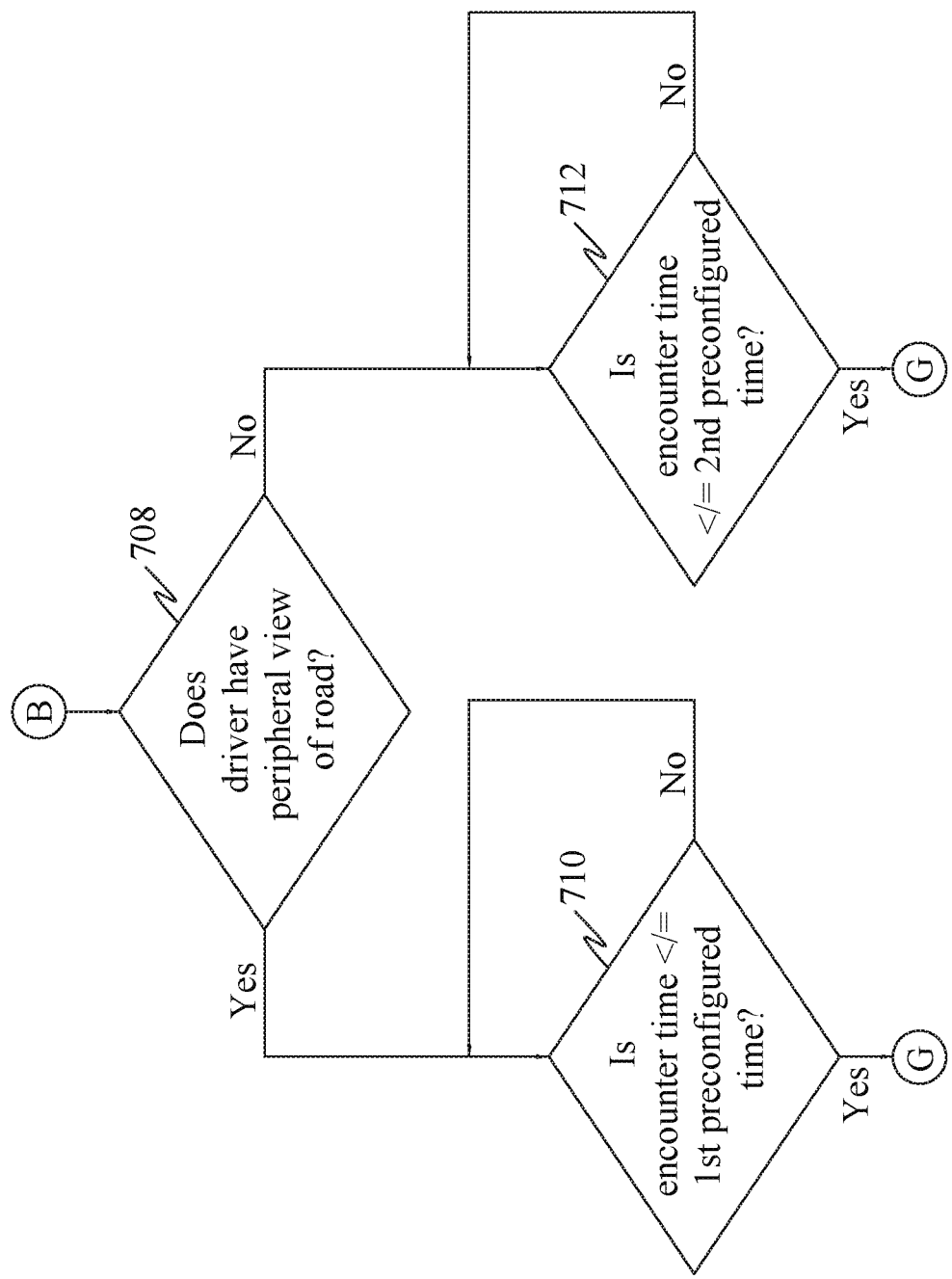

FIG. 7B depicts a flowchart of an exemplary method 714 for operating the automobile safety system 102, in accordance with an embodiment. The method 714 may describe how to generate an alert in case the driver was found to be inattentive and an object was detected.

At step 708, the decision-making module 320 determines whether the driver has retained a peripheral view of the road or not. In case the driver has only the peripheral view of the road, the decision-making module 320 may determine whether the encounter time of the automobile and detected object is less than or equal to the first preconfigured time at step 710. In case the encounter time is greater, the decision-making module 320 may monitor the encounter time until it becomes less than or equal to the first preconfigured time. In case the encounter time is smaller, the decision-making module 320 may proceed to step G of FIG. 9 to generate an alert.

In case the driver does not have the peripheral view of the road, the decision-making module 320 may determine whether the encounter time between the automobile and detected object is less than or equal to the second preconfigured time at step 712. In case the encounter time is greater, the decision-making module 320 may monitor the encounter time until it becomes less than or equal to the second preconfigured time. In case the encounter time is smaller, the decision-making module 320 may proceed to step G of FIG. 9 to generate an alert. The second preconfigured time may be a greater value compared to the first preconfigured time.

FIG. 8A depicts a flowchart of an exemplary method 800 for operating the automobile safety system 102, in accordance with an embodiment. The method 800 may describe how to generate an alert in case the driver was found to be inattentive and the speed of the automobile was crossing the predetermined speed threshold.

At step 802, the decision-making module 320 may receive one or more status inputs from the other modules in the processing module 302.

At step 804, the decision-making module 320 may determine whether the driver is drowsy or distracted from the inputs received at step 802. In case the driver is not drowsy or distracted, the decision-making module 320 may further monitor the inputs being received.

In case the driver is found to be drowsy or distracted, at step 806 the decision-making module 320 may check whether the automobile speed has crossed the predetermined speed threshold. In case the automobile speed has not crossed the predetermined speed threshold, the decision-making module 320 may further monitor the inputs being received from other modules of the processing module 302.

In case the automobile speed crossed the predetermined speed threshold, the decision-making module 320 may proceed to step G in FIG. 9 to generate an alert. On the other hand, if the speed does not cross the threshold, then the process may proceed to step "A" (FIG. 7A) or "B" (FIG. 7B) depending on whether an object was detected.

In an alternate embodiment, in case the automobile speed crossed the predetermined speed threshold at step 806, the decision-making module 320 may further proceed to step A of FIG. 7A (not shown in fig.).

FIG. 8B depicts a flowchart of an exemplary method 808 for operating the automobile safety system 1027, in accordance with an embodiment. The method 808 may describe how to generate an alert in case the driver was found to be inattentive and the automobile was changing lanes due to the driver's inattentiveness.

At step 810, the decision-making module 320 may receive one or more status inputs from the other modules in the processing module 302.

At step 812, the decision-making module 320 may determine whether the driver is drowsy or distracted from the inputs received at step 810. In case the driver is not drowsy or distracted, the decision-making module 320 may further monitor the inputs being received.

In case the driver is found to be drowsy or distracted, at step 814 the decision-making module 320 may check whether the automobile has shifted from one lane to another while the driver was distracted. In case the automobile has not shifted lanes, the decision-making module 320 may further monitor the inputs being received from other modules of the processing module 302.

In case the automobile has shifted lanes, the decision-making module 320 may proceed to step G in FIG. 9 to generate an alert. On the other hand, if the automobile has not shifted lanes, then the process may proceed to step "A" (FIG. 7A) or "B" (FIG. 7B) depending on whether an object was detected.

FIG. 9 depicts a flowchart of an exemplary method 900 for operating the automobile safety system 102, in accordance with an embodiment. The method 900 may describe how to generate an alert.

At step 902, the decision-making module 320 may determine whether an object is present on the road ahead of the automobile from the continuous status updates sent by the other modules of the processing module 302.

At step 904, in case an object is present, the decision-making module 320 may direct the speaker module 316 to generate a first pre-set type of alert.

In case no object is present, at step 906, the decision-making module 320 may direct the speaker module 316 to generate a second pre-set type of alert.

In an embodiment, an alert of the first pre-set type may have a higher potential to alert a driver than an alert of the second pre-set type. The alert generated in case of a detected object may be a predetermined sound of a predetermined first pre-set type, which helps the driver in recognising that an object is present on the road ahead based on the type of predetermined alert. The alert generated in case of no detected object may be chosen from a plurality of types of alerts such that the driver does not get accustomed to a single second pre-set type of alert.

At step 908, the decision-making module 320 may determine whether the driver is still distracted. In case the driver is still distracted, at step 910, the decision-making module may continue to generate an alert over a pre-set duration of time, beyond which the alert may be terminated.

At step 912, in case the decision-making module 320 has determined that the driver's attention is back on the road and that they are not drowsy or distracted anymore, the decision-making module 320 may terminate the alert and reset the timer which counted the driver's distraction duration. Further, the decision-making module may restart the alert-generating process from step 602 of FIG. 6.

In an embodiment, there may be multiple pre-set types for the alerts generated by the automobile safety system 102. The automobile safety system 102 may be able to configure different types of alerts for each pre-set type. As an example, a third pre-set type of alert may include only a light alert. If the driver is still inattentive after the third pre-set type of alert was generated, the automobile safety system 102 may generate an alert corresponding to the second pre-set type of alert which may include a light alert and a sound alert. Further, in case an object is detected, the automobile safety system may generate an alert corresponding to a first pre-set type of alert, which may include the generation of a light alert and a louder sound alert, among others.

In an embodiment, the automobile safety device may generate different alerts in order to prevent the driver from getting used to the alerts and subsequently ignoring them. A random alert out of a plurality of alerts may be generated for a pre-set type of alert wherein no object was detected. A predetermined alert out of a plurality of alerts may be generated for a first pre-set type of alert in order to make sure that the driver does not ignore an alert generated in a situation wherein an object was detected.

In an embodiment, the alerts generated by the automobile safety system 102 may last for a predetermined time limit which may be configured by the user. For example, generated alerts may last for similar or varying time limits depending on the situation in which the alert was generated. Further, in case an object was detected, the automobile safety system 102 may skip intermediate pre-set types of alerts and directly generate an alarm corresponding to a first pre-set type of alert.

In an embodiment, the automobile safety system 102 is configured to communicate with a smartphone 104 of a driver to turn on a driving mode in the smartphone. The smartphone operating in driving mode limits distraction caused to the driver as compared to the distraction caused to the driver by the smartphone when the driving mode is turned off. The communication with the smartphone may be via ultrasonic signals, in an embodiment.

Figure 10:
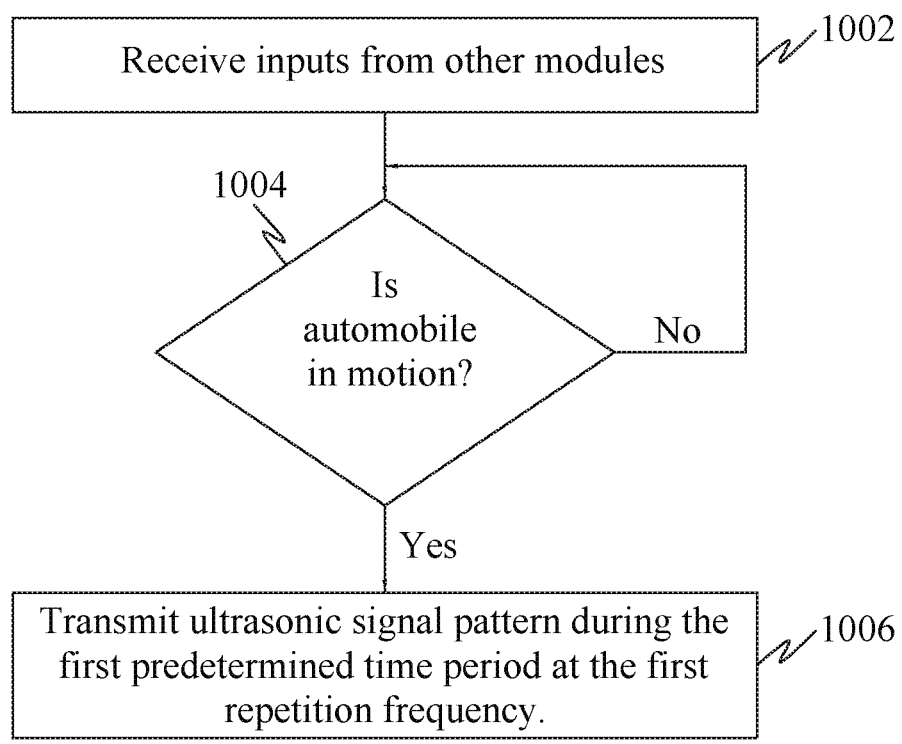
FIG. 10 is a flowchart of an exemplary method for turning on driving mode in the driver's smartphone 104, in accordance with an embodiment.

FIG. 10 depicts a flowchart of an exemplary method for operating the automobile safety system 102, in accordance with an embodiment. At step 1002, the decision-making module 320 may receive continuous status updates sent by the other modules of the processing module 302. From these statuses, the decision-making module may determine at step 1004, whether the automobile is in motion. In case the automobile is not moving, the decision-making module may further monitor the received statuses.

In case the automobile is in motion, at step 1006 the decision-making module 320 may determine to transmit signals to establish communication with the driver's mobile device 104.

The safety module 416 may process the signals received from the microphone in order to determine whether the signals transmitted by the automobile safety system 102 is present in the signals received by the microphone during the time period in which it was kept turned on. In case no such audio or ultrasonic signal patterns were detected, the safety module 416 may continue to monitor the received signals.

In case the safety module 416 has detected the signals transmitted by the automobile safety system 102, the safety module 416 may acknowledge the detected signal and may direct the speaker to transmit an acknowledgement signal which may be received by the automobile safety system 102. Further, the safety module 416 may turn on a driving mode in the driver's mobile device 104.

In an embodiment, the driver may exit the automobile, taking their driver's mobile device 104 along with them. In such cases, the safety module 416 may try to continuously detect the presence of the signal transmitted by the automobile system 102.

In case the safety module 416 does not detect the signal, it may turn off the driving mode in the driver's mobile device.

In an embodiment, if the automobile has stopped moving for at least a predetermined time limit, the safety module 416 may turn off the driving mode of the driver's mobile device 104.

In an embodiment, one or more parameters such as first preconfigured time, second preconfigured time, speed threshold, first distraction duration and second distraction duration may be configured in the automobile safety system 102 by using an external source. Such an external source may include the safety module 416 installed on the driver's mobile device 104 or the display 208, among ways to configure the automobile safety system 102.

The forgoing disclosure overcomes the drawbacks of the conventional automobile safety system, by detecting the motion of an automobile and changing the mode of the driver's mobile device 104 to a driving mode so as to prevent the mobile device from distracting the driver. Further, the system alerts the driver when they are inattentive or drowsy and the automobile is approaching an object. Thus, the present invention as discussed in this document with respect to different embodiments will be advantageous at least in providing additional protection for a driver. Further, it is advantageous in providing better safety, decreasing the chances of accidents and collisions. It is also advantageous in helping the driver to keep track of drowsy or distracted driving done by other drivers using the driver's automobile and avoid potentially harmful situations caused by drowsy or distracted drivers and other such people. Furthermore, the system is also advantageous in decreasing accident rates. Additional advantages not listed may be understood by a person ordinary skilled in the art in view of the embodiments disclosed above.

In the foregoing detailed description, numerous specific details, examples, and scenarios are explained in order to facilitate a thorough understanding of the present disclosure. However, the embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation. Thus, the scope of the invention should be determined by the appended claims and their legal equivalents rather than by details, examples, and scenarios provided.

It shall be noted that the processes described above are described as sequence of steps; this was done solely for the sake of illustration. Accordingly, it is understood that some steps may be added, some steps may be omitted, the order of the steps may be re-arranged, or some steps may be performed simultaneously.

Although embodiments have been described with reference to specific example embodiments, it will be evident that various combinations, modifications, additions, and omissions may be made to these embodiments without departing from the broader spirit and scope of the foregoing disclosure and appended claims. Accordingly, the specification and drawings are to be regarded in an illustrative sense rather than a restrictive sense. It is to be understood that the phraseology or terminology employed herein is for the purpose of description and not of limitation.

What is claimed is:

1. A safety system for an automobile, the system comprising:
    a first camera (202) directed to have a field of view to capture video of a driver of the automobile;
    a second camera (204) directed to have a field of view to capture video of a road ahead of the automobile; and
    a processing module (302) configured to:
        detect whether the driver is attentive by processing video input from the first camera (202);
        detect presence of an object on the road by processing video input from the second camera (204);
        ascertain speed at which the automobile is travelling;
        ascertain distance of the detected object from the automobile;
        determine encounter time, wherein the encounter time is the time required for the automobile to reach the object based on the speed and the distance;
        alert if the driver is not attentive, wherein the alerting of the driver is initiated when the encounter time is less than or at least becomes equal to a second preconfigured time, if the driver lacks even a far peripheral view of the road ahead; and
        alert if the driver is not attentive, wherein the alerting of the driver is initiated when the encounter time is less than or at least becomes equal to a first preconfigured time, if the driver only has the far peripheral view of the road ahead, wherein the second preconfigured time is greater than the first preconfigured time.

2. The safety system according to claim 1, wherein the first preconfigured time and the second preconfigured time are variables, which vary with the speed of the automobile.

3. The safety system according to claim 1, wherein the system further comprises a GPS module, wherein the processing module (302) is configured to ascertain the speed of the automobile by processing input received from the GPS module, thereby making the automobile safety system (102) independent of a speedometer of the automobile.

4. The safety system according to claim 1, wherein the processing module (302) is configured to ascertain the speed of the automobile by processing the video input from at least the second camera (204), thereby making the automobile safety system (102) independent of a speedometer of the automobile.

5. The safety system according to claim 1, wherein the processing module (302) is further configured to generate an alert even when the object is not detected if:
    the driver lacks even the far peripheral view of the road ahead at least for a second distraction duration; or
    the driver only has the far peripheral view of the road ahead for a first distraction duration, wherein the second distraction duration is lesser than the first distraction duration.

6. The safety system according to claim 5, wherein the processing module (302) is further configured to generate a first pre-set type of alert when the alert is generated based on object being detected and generate a second pre-set type of alert when the alert is generated even when the object is not detected.

7. The safety system according to claim 5, wherein the second pre-set type of alert is chosen from a plurality of types of alerts such that a driver does not get accustomed to a single second pre-set type of alert.

8. The safety system according to claim 5, wherein the first pre-set type of alert has a higher potential to alert a driver compared to the potential of the second pre-set type of alert.

9. The safety system according to claim 1, wherein the processing module (302) is further configured to generate an alert even when the object is not detected if the speed of the automobile exceeds a speed threshold, and:
    the driver lacks even the far peripheral view of the road ahead at least for a second distraction duration; or
    the driver only has the far peripheral view of the road ahead for a first distraction duration, wherein second distraction duration is lesser than the first distraction duration.

10. The safety system according to claim 1, wherein the processing module (302) is further configured to generate an alert even when the object is not detected if the speed of the automobile exceeds a speed threshold and the driver is not attentive.

11. The safety system according to claim 1, wherein the processing module (302) is further configured to terminate the alert if the processing module (302) detects by processing the video input from the first camera (202) that the driver is back to being attentive.

12. The safety system according to claim 1, wherein the processing module (302) is further configured to terminate the alert after alerting for a pre-set duration of time.

13. The safety system according to claim 1, further comprising a housing, wherein the housing is readily attachable and detachable from the automobile, the housing comprises the first camera (202), the second camera (204) and the processing module (302).

14. The safety system according to claim 1, wherein the processing module (302) is further configured to communicate with a smartphone of a driver to turn on a driving mode in the smartphone, wherein the smartphone operating in driving mode limits distraction caused to the driver as compared to the distraction caused to the driver by the smartphone when the driving mode of turned off.

15. The safety system according to claim 1, wherein the processing module (302) is further configured to communicate with the smartphone via ultrasonic signals.

16. The safety system according to claim 1, wherein the safety system is configured to be in a first mode when the automobile is turned on and in a second mode when the automobile is moving, wherein the power consumed by the safety system in the first mode is less than the power consumed by the safety system in the second mode.

17. The safety system according to claim 1, wherein the processing module (302) is further configured to generate an alert if the driver is distracted and the automobile is shifting lanes, which is determined by processing the video input from the second camera (204).

* * * * *